March 26, 1974    W. J. LEWICKI, JR., ET AL    3,799,822
METHOD OF MANUFACTURING A COMPRESSIBLE SURFACE PRINTING ROD
Filed Oct. 13, 1971
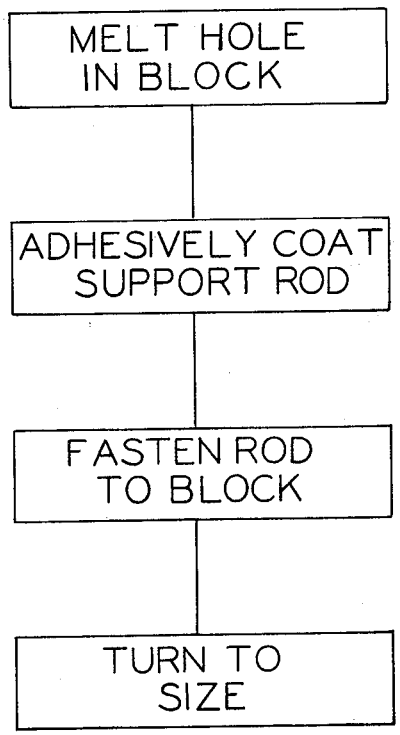
INVENTOR
WALTER J. LEWICKI, JR.
KENNETH L. WELK
BY *Clifford B. Price*
ATTORNEY

United States Patent Office 3,799,822
Patented Mar. 26, 1974

3,799,822
METHOD OF MANUFACTURING A COMPRESSIBLE SURFACE PRINTING ROD
Walter J. Lewicki, Jr., and Kenneth L. Welk, Lancaster, Pa., assignors to Armstrong Cork Company, Lancaster, Pa.
Filed Oct. 13, 1971, Ser. No. 188,858
Int. Cl. B29c 27/00; B32b 31/12
U.S. Cl. 156—83          1 Claim

ABSTRACT OF THE DISCLOSURE

A method is provided for placing a polyurethane foam coating on a metal shaft of a printing roller. A hole is melted in the polyurethane foam block, and the rod is then placed in the hole and adhesively secured to the polyurethane. The structure is then reduced to the required diameter to provide a printing roller with a compressible cover of polyurethane.

CROSS REFERENCE TO RELATED APPLICATION

The invention herein is the method of making the compressible cover squeegee rod used in the apparatus for carrying out the method of copending commonly assigned application Ser. No. 93,183, filed Nov. 27, 1970, in the name of Walter J. Lewicki, Jr., and entitled "Compressible Magnetic Rod for Rotary Screen Printing."

BACKGROUND OF THE INVENTION

Field of the invention

The invention herein is directed to a printing roller and, more particularly, to a method of placing the polyurethane foam coating on a printing roller.

DESCRIPTION OF THE PRIOR ART

U.S. Pat. No. 3,133,340 is typical of the current methods used to place a polyurethane covering on a printing roller. In all cases taught by the prior art, the polyurethane coating is cast on the metal support rod which passes through the core of the roller.

Obviously, as the prior art indicates, it is necessary that the polyurethane covering be capable of absorbing and dispensing ink in a uniform manner. If the covering was made of sheet polyurethane foam and the sheet wrapped around the support rod and the two ends glued together, there would be a seam line which would have a glued edge. This particular area would not take in a dispense ink in the same manner as the rest of the polyurethane material. Consequently, it is imperative that the polyurethane foam covering on the printing roll be uniform throughout the full circumference and along the major length of the printing roller. However, when the support rod is a yard or more in length, and is of a relatively small diameter, casting is very difficult.

SUMMARY OF THE INVENTION

The invention herein is the method of placing a polyurethane foam covering over a metallic rod. A compressible surface magnetic rod is formed which has an absorbent covering of the reticulated open-celled polyurethane foam and the rod is used in the method and apparatus described in the above-mentioned copending application Ser. No. 93,183. A block of polyurethane foam material has a hole burned through the middle thereof. The metal core support rod is coated with adhesive and placed within the hole of the polyurethane block. The adhesive bonds the polyurethane to the metal support rod. The total assembly is then reduced to the required diameter by rotating the block in a machine lathe and simultaneously grinding it in a transverse direction. A plurality of printed rolls so made may be joined together to form a single unitary printed roll structure up to five meters in length.

BRIEF DESCRIPTION OF THE DRAWING

The drawing shows a flow diagram of the different steps used in carrying out the claimed method.

DESCRIPTION OF THE PREFERRED EMBODIMENT

The invention herein covers the manufacturing sequence for a compressible surface magnetic squeegee rod having an absorbent covering of a reticulated or non-reticulated open-celled polyurethane foam. The open-celled polyurethane foam has 60 pores per inch. As the prior art indicates, a number of different polyurethane materials are available, and any one of a number of different polyurethane foam materials could be selected. The purpose of the process herein is to produce rods, called "squeegee rods," for both the two and five meter Zimmer rotary-screen printers.

The first step in the manufacturing method is the melting of a ¾" diameter hole through the center and length of a 4" x 4" x 40" block of reticulated open-celled polyurethane foam, using a guided metal rod with a ⅝" diameter bulbous pointed head with the point heated to a cherry-red color. The foam block is held vertically in a container which will hold the foam securely, but not clamp it enough to compress it substantially.

A metal rod is used to provide the main support for the roller, and it is inserted through the hole in the polyurethane material so that the combination forms the compressible surface magnetic rod. The magnetic metal rod is so named because the Zimmer rotary-screen printers will require that the rod be magnetically attracted. The rod is formed from a 1" outside diameter solid rod or tubing. An adhesive film or hot melt is applied to the outside surface of the metal rod. One typical adhesive that can be used is the Dow Chemical's PZ–4333.9 Adhesive Copolymer Film which is placed on the rod to a 6 mil thickness. This particular adhesive provides excellent adhesion of the metal and the polyurethane foam. Naturally, other conventional adhesives could be used. The particular adhesive used melts at a temperature of about 250° F., which temperature will not affect the foam. The adhesive also has excellent chemical resistance to the printing ink and to the solvents used in the ink clean-up. The adhesive-coated rod is heated to set the adhesive as an adhesive film on the rod. If a tubing is used, steam at 135 p.s.i. and at 350° F. is passed through the core of the tube for one minute followed by a cold water chilling. This is sufficient to set the Dow Chemical adhesive on the support rod of the squeegee assembly.

The foam block is rinsed in a solvent, such as xylene or chlorothene, until it swells sufficiently to slip over the rod. After the solvents have evaporated from the polyurethane foam and it is over the rod, steam and then cold water can then be passed through the tube again in order to remelt the adhesive film and adhere the foam to the metal core. Since the hole diameter in the unswollen foam is considerably less than that of the metal core, an extremely tight bond is produced during this step of the process.

The foam block is now adhered to the metal core. In order to secure the desired cover thickness, the metal core with the foam block is rotated in a lathe, and the polyurethane is ground until such time as the polyurethane is converted into a circular covering over the rod of about ⅜" in thickness.

By joining together five individual sections as made above, it is possible to form a continuous five meter squeegee rod of any length possible. Threaded connectors will be used between the different rod sections to join them together. When each section is tightened against one another, the foam at the joint forms a compressed butt joint. Naturally in use, the assembly would be mounted with bearings which are on the rod ends sticking out of the polyurethane covering.

What is claimed is:

1. A method of manufacturing a compressible surface rod structure having a hollow core and a covering of an absorbent open-celled foam, comprising the steps of melting a hole through a block of open-celled foam using a heated tool to melt the hole through the block of foam, treating the foam block with a solvent to cause the foam to swell and the hole in the foam block to increase its size until its hole diameter is sufficient to permit the foam block to be slipped over the core, said core being coated with an adhesive on the surface thereof, said adhesive being initially set by heat, assembling the foam block on the core, permitting the hole in the foam block to decrease in size to form a tight fit of the foam block to the core, and further permitting the adhesive to bond the foam block to the core, said last-mentioned two steps of permitting the hole in the foam block to decrease and permitting the adhesive to bond the foam block to the core being carried out by the steps of passing steam through the hollow core to evaporate the solvent in the foam block and shrink the foam block onto the core and to remelt the adhesive on the core, and then the step of passing cold water through the hollow core to reset the adhesive.

References Cited
UNITED STATES PATENTS

| | | | |
|---|---|---|---|
| 3,625,788 | 12/1971 | Bartner | 156—86 X |
| 3,673,025 | 6/1972 | Fukuyama et al. | 156—154 |
| 2,279,929 | 10/1966 | Ferch | 156—83 |
| 3,002,866 | 10/1961 | Gartrell et al. | 29—129.5 |
| 3,560,295 | 2/1971 | Kimbrell et al. | 156—294 |

ALFRED L. LEAVITT, Primary Examiner

B. J. LEWRIS, Assistant Examiner

U.S. Cl. X.R.

29—129.5; 117—94; 156—86, 154, 294, 309